US006651739B2

(12) United States Patent
Arndt et al.

(10) Patent No.: US 6,651,739 B2
(45) Date of Patent: Nov. 25, 2003

(54) MEDIUM FREQUENCY PSEUDO NOISE GEOLOGICAL RADAR

(75) Inventors: G. Dickey Arndt, Friendswood, TX (US); James R. Carl, Houston, TX (US); Kent A. Byerly, Seabrook, TX (US); B. Jon Amini, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 149 days.

(21) Appl. No.: 09/793,817

(22) Filed: Feb. 21, 2001

(65) Prior Publication Data

US 2002/0112855 A1 Aug. 22, 2002

(51) Int. Cl.[7] .............................................. E21B 47/04
(52) U.S. Cl. .............................. 166/250.03; 166/254.2; 175/50; 73/152.02
(58) Field of Search ........................... 166/254.2, 254.1, 166/250.03; 175/50; 324/326; 342/22, 25; 73/152.02

(56) References Cited

U.S. PATENT DOCUMENTS

| 4,866,446 A | | 9/1989 | Hellsten ...................... 342/25 |
| 4,937,580 A | | 6/1990 | Wills ........................... 342/22 |
| 4,965,582 A | | 10/1990 | Hellsten ...................... 342/25 |
| 5,064,006 A | * | 11/1991 | Waters et al. ................. 175/45 |
| 5,357,253 A | * | 10/1994 | Van Etten et al. ............. 342/22 |
| 5,659,985 A | | 8/1997 | Stump .......................... 37/348 |
| 5,819,859 A | | 10/1998 | Stump et al. ................. 175/26 |
| 5,869,967 A | | 2/1999 | Straus ......................... 324/326 |
| 5,900,833 A | | 5/1999 | Sunlin et al. ................. 342/22 |
| 5,904,210 A | | 5/1999 | Stump et al. ................. 175/45 |
| 5,933,014 A | | 8/1999 | Hartrumpf et al. ......... 324/642 |
| 6,181,138 B1 | * | 1/2001 | Hagiwara et al. ........... 324/338 |

* cited by examiner

*Primary Examiner*—David Bagnell
*Assistant Examiner*—Zakiya Walker
(74) *Attorney, Agent, or Firm*—Theodore U. Ro (57) ABSTRACT

System and methods are disclosed for transmitting and receiving electromagnetic pulses through a geological formation. A preferably programmable transmitter having an all-digital portion in a preferred embodiment may be operated at frequencies below 1 MHz without loss of target resolution by transmitting and over sampling received long PN codes. A gated and stored portion of the received signal may be correlated with the PN code to determine distances of interfaces within the geological formation, such as the distance of a water interfaces from a wellbore. The received signal is oversampled preferably at rates such as five to fifty times as high as a carrier frequency. In one method of the invention, an oil well with multiple production zones may be kept in production by detecting an approaching water front in one of the production zones and shutting down that particular production zone thereby permitting the remaining production zones to continue operating.

34 Claims, 9 Drawing Sheets

FIG. 9
RADIATION PATTERN OF A
SHORT DIPOLE ANTENNA ARRAY

MEDIUM FREQUENCY PSEUDO NOISE GEOLOGICAL RADAR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to ground penetrating radar and, more specifically, to a preferably digitally controlled transceiver operable to produce and broadcast a pseudo noise code through geological formations at medium frequencies.

2. Description of Prior Art

Ground penetrating radars generally require a carrier frequency of at least 50 MHz in order to provide a useable range resolution. This frequency is too high to penetrate many lithologies of interest. If the carrier frequency is greatly reduced to permit better penetration of the medium, then the bandwidth of the radar must also be reduced. Range resolution is directly related to the bandwidth, thus the resolution becomes poor and the radar may be useless. It would be desirable to provide a system wherein resolution was not dependent on bandwidth so that lower frequency transmission could be used.

Ground imaging radar systems also require system bandwidths much higher than possible in the down-hole environment. Another problem of the prior art is that multiple sensors or moving sensors are generally used for image forming and this is generally not possible or not practical at a subsurface location within a small diameter hole.

Most magnetically based detectors are used for metal detection. Such detectors are not generally useable for detection of downhole formation features and properties such as a water incursion many meters from the instrument because of a lack of sensitivity, poor resolution, and a weak response to water or other interfaces.

One use of a radar that could be transmitted at relatively lower frequencies for detecting formation interfaces would be to detect and locate the movement of approaching water to an oil producing well such as the water incursion caused by water injection that is used to assist in the extraction of oil. The detection of injected water in one or more production zones of the well would permit these sections of the well to be shut down in a timely manner and thereby allow for continued production from other zones of the well. If the water incursion is permitted to flow into the well through only one zone, then production from all zones may typically need to be stopped.

Another use of such a radar concerns a basic problem that has existed in the well logging business for decades, i.e., the effects of invasion that occur prior to running casing. During drilling, the drilling fluid which may be water or oil based is typically weighted to be overbalanced so as to prevent a blowout. The pressure at the formations of interest due to the overbalanced fluid column within the wellbore forces the drilling fluid into the formation and displaces the true formation fluids to produce what is commonly known as invasion. The invaded zone may typically extend into the formation by an amount usually less than about two meters. Because electronic logging tools are attempting to detect and measure the true formation fluids which have been displaced by an undetermined amount of drilling fluid, inaccuracies have, for decades, plagued the logging industry. The standard method for overcoming such inaccuracies is to use two or more sensors of the same or similar type that read different depths into the formation, e.g., dual laterolog tools, dual induction tools, and dual spaced neutron tools and use the difference in readings to correct for invasion. However, due to the unknown amount of change in resistivities, permittivities, electron densities, and so forth caused by the displacement of true formation fluid, and due to partial invasion regions wherein invasion is not complete, inaccuracies caused by invasion may be difficult to resolve. Therefore, it would be highly desirable to provide a downhole logging tool for logging prior to installation of casing that directly measures the depth of invasion to thereby provide a more reliable means for correcting the errors produced in logging tools due to invasion.

U.S. Pat. No. 4,937,580, issued Jun. 26, 1990, to R. H. Wills, discloses a ground probing radar for detecting radar reflections from underground objects. The radar is of the pulse compression type. A transmitter generates a biphase digitally modulated carrier signal. The digital modulations comprise successive pairs of complementary codes. Reflections of the transmitted signal from underground objects are demodulated and cross-correlated with the code words to produce a reflectivity sequence signal. The use of complementary codes results in minimal time sidelobes and improved range and resolution.

U.S. Pat. No. 5,904,210, issued May 18, 1999, to Stump and Allen, discloses an apparatus and method for determining a location and an orientation of an underground boring tool by employment of a radar-like probe and detection technique. The boring tool is provided with a device which generates a specific signature signal in response to a probe signal transmitted from above the ground. Cooperation between the probe signal transmitter at ground level and the signature signal generating device provided at the underground boring tool results in accurate detection of the boring tool location and, if desired, orientation, despite the presence of a large background signal. Precision detection of the boring tool location and orientation enables the operator to accurately locate the boring tool during operation and, if provided with a directional capacity, avoid buried obstacles such as utilities and other hazards. The signature signal produced by the boring tool may be generated either passively or actively, and may be a microwave or an acoustic signal. Further, the signature signal may be produced in a manner which differs from that used to produce the probe signal in one or more ways, including timing, frequency content, information content, or polarization.

U.S. Pat. No. 5,900,833, issued May 4, 1999, to Sunlin and Heger, discloses a ground penetrating impulse radar system providing three-dimensional images of targets. A moving array of transmitting and receiving antennas provides narrow beamwidths and high gain by real and synthetic aperture beam processing. Narrow pulsewidth impulse signals are utilized to obtain high resolution. Round trip time is calculated for each three-dimensional pixel in a search volume, and is used to process three-dimensional imagery. Analog to digital conversion can be utilized, so all signal processing is accomplished digitally. The radar system is applicable in detecting small objects near the surface by using very narrow pulses, and also can be applied to detect large, deep objects by wider pulses.

U.S. Pat. No. 5,869,967, issued Feb. 9, 1999, to Reinhold Straus, discloses a device for the detection of objects lying in the earth which, irrespective of topography, soil structure and state of the terrain, permits high surface yields with great precision in identifying the position of the objects to be detected without endangering the operating personnel. On a mobile device is arranged at least one jib that swivels about a vertical axis, on whose free end are arranged adjacent to each other several measuring heads for sweeping over strip-shaped surface areas of the terrain to be investigated. With the measuring heads on the free end of the jib at least one ground marking device is arranged for distinguishing the find site determined by the measuring heads.

U.S. Pat. No. 5,819,859, issued Oct. 13, 1998 (disclaimed—not to extend beyond the expiration date of U.S. Pat. No. 5,720,354), to Stump and Allen, discloses an apparatus and method for locating an underground object or structure by employment of a radar-like probe and detection technique. The underground structure is provided with a device which generates a specific signature signal in response to a probe signal transmitted from above the ground. Cooperative action between the probe signal transmitter at ground level and the signature signal generating device provided on the underground object provides for accurate detection of the subsurface object, despite the presence of a large background noise signal.

U.S. Pat. No. 5,659,985, issued Aug. 26, 1997 (disclaimed—not to extend beyond the expiration date of U.S. Pat. No. 5,553,407), to Greg Stump, discloses an information acquisition and control system and process that acquires geological information from a subsurface and modifies the operation of an excavating machine using the acquired geological information. The system includes a data acquisition system to acquire geological information along an excavation route, a machine controller to control the operation of the excavating machine, and a main controller that produces estimated machine performance parameters for use by the machine controller using the acquired geological information and machine operation information. In another embodiment, geologic characteristics acquired for a first subsurface are associated with excavation performance information for the first subsurface to produce correlation data. Geologic characteristics acquired at a second subsurface are compared with the correlation data to produce estimated excavation performance information for the second subsurface.

U.S. Pat. No. 4,965,582, issued Oct. 23, 1990, to Hans O. Hellsten, discloses an invention relating to a method for radar mapping an area and radar equipment for wideband exploration at frequencies below 300 MHz. A large number of frequencies, for instance 1000, are distributed over a frequency band between for instance 12.5 and 200 MHz, and approximately corresponding to terms in a geometrical series but being different harmonics to a certain fundamental frequency. This is accomplished by a synthesis generator coupled to a phase control device and the generated frequencies are each amplified in a separate amplifier, the outputs of which are guided in groups to a number of antennas, tuned to different frequency bands and fewer than the number of frequencies. The reception is carried out in a similar way from the antennas with pre-amplifiers and a mixer each and an A/D-converter and a registration device. The equipment is meant to use the principle of so called synthetic aperture radar (SAR).

U.S. Pat. No. 4,866,446, issued Sep. 12, 1989, to Hans O. Hellsten, is the parent patent to the above listed U.S. Pat. No. 4,965,582 discussed hereinbefore.

U.S. Pat. No. 5,933,014, issued Aug. 3, 1999, to Hartrumpf et al., discloses a process for detecting totally or partially hidden faults, such as cracks, and bubbles and the like in an opaque medium, by using microwave radiation. Microwaves from a transmitting antenna are directed against the surface of the medium which is to be inspected, and microwave radiation reflected or back scattered from the medium is detected and analyzed. In order to maximize the signal to noise ratio, minimizing the detection of radiation reflected by the surfaces of the medium itself, at least one of the transmitting antenna and the receiving antenna is oriented at an oblique angle relative to the surface of the medium.

International Publication No. WO 98/31209, published Jul. 23, 1998, to Ericksson et. al., discloses a forest vehicle provided with automatic planting assemblies mounted at hydraulically controlled arms. At the frontmost portion of the vehicle on a movable arm scanning means such as a georadar screen are provided, which transmit radar waves having a suitable wavelength and scan the ground area in front of the vehicle. The georadar determines the depth of soil and obstacle to planting such as stones and stumps.

The above prior art does not disclose a system that may be used in a borehole wherein operation may occur at medium frequencies and wherein resolution of formation features is not dependent upon system bandwidth. Therefore, those skilled in the art have long sought and will appreciate the present invention that addresses these and other problems.

SUMMARY OF THE INVENTION

An object of the present invention is to provide an improved system for detecting subterranean interfaces such as fluid interfaces or geological interfaces.

Another object of the present invention is to detect slow movement or changes in subterranean interfaces.

Yet another object of the present invention is to detect and locate the movement of approaching water to an oil producing well such as the water incursion caused by a water injection well that is used to assist in the extraction of oil.

A feature of one embodiment of the invention is a radar implemented as a downhole logging tool to contribute to the understanding of the lithography surrounding a borehole.

Another feature of a presently preferred embodiment of the invention is that a sampling speed of an analog to digital converter determines range measurement accuracy and range measurement resolution rather than the bandwidth of the system.

Another feature of a presently preferred embodiment of the present invention is a dynamic transmit/receiving gating that permits reflected signals that vary in magnitude over a very large dynamic range to be accommodated whereby the dynamic transmit/receiving gating operates so that only reflections from a particular range of distances are processed at any one time.

Yet another feature of one preferred embodiment of the present invention is a digital design that can be packaged and ruggedized to withstand the temperatures, pressures and size constraints of a down-hole environment.

An advantage of the present invention is the ability to map geological formation and fluid interfaces and track the movement of underground liquids such as in underground water reservoirs.

Yet another advantage of the present invention is the ability to produce very strong correlation peaks associated with long pseudo noise codes that can be used to discriminate against reflected signals from other ranges not currently being measured.

Yet another advantage of the present invention is great versatility and configurability to permit the same equipment to be used for a wide variety of applications.

These and other objects, features, and advantages of the present invention will become apparent from the drawings, the descriptions given herein, and the appended claims. It will be understood that above listed objects, features, and advantages of the invention are intended only as an aid in understanding aspects of the invention, are not intended to limit the invention in any way, and do not form a comprehensive list of such objects, features, and advantages.

Therefore, the present invention comprises a method for detecting interfaces in an earth formation that comprises such steps as generating a plurality of digital pulses, producing the plurality of digital pulses at a carrier frequency, and transmitting the plurality of digital pulses into the geological formation from a first physical position. A received signal is comprised of reflections of the plurality of digital pulses from the geological formation. The received signal is oversampled with a sampling rate that is greater than five times the carrier frequency to produce a digitized received signal. A gate may be used to select a portion of the digitized received signal during a selected time frame of the received signal to thereby provide a gated digitized received signal. The plurality of transmitted digital pulses are correlated with the gated digitized received signal for detecting an interface at a selected distance from the first physical position.

The present invention permits utilizing a carrier frequency in the range from 100 KHz to 1 MHz. The plurality of digital pulses may be accumulated over a selected period of time prior to the step of correlating. In a preferred embodiment, a digital to analog converter is provided for converting the plurality of digital pulses at the carrier frequency to an analog signal prior to the step of transmitting. In this case, the step of producing of the plurality of digital pulses at the carrier frequency may be completed entirely with digital components. The step of oversampling may further comprise oversampling the received signal such that a sampling rate is used that is from five to fifty times the carrier signal.

In a preferred embodiment of the invention, the first position may be within a borehole through the earth formation or adjacent thereto. The method may then further comprise transmitting the plurality of digital pulses from a dipole antenna within the borehole. Moreover, the method may comprise providing a plurality of dipole antennas within a downhole tool. The plurality of digital pulses may be transmitted through a non-ferrous wellbore tubular.

In other words, the invention may provide a downhole system for detecting interfaces in an earth formation, the downhole system may be operable in a borehole within the earth formation. In this case, the downhole system preferably comprises an all digital signal generator for producing a plurality of digital pulses at a carrier frequency and at least one dipole antenna associated with the downhole system for transmitting a transmitted signal and receiving a reflected signal. The analog to digital signal converter is then provided for sampling the received signal at a sampling rate more than five times the carrier frequency to produce a received digital signal. The correlator compares the plurality of transmitted digital pulses with respect to the received digital signal.

To facilitate an all-digital transmitter system, a digital to analog converter may be provided for converting the plurality of digital pulses at the carrier frequency to an analog signal. The carrier frequency may be selectable and may, unlike other georadars, be selected to be less than 1 MHz. In fact, the carrier frequency may be between 100 KHz and 1 MHz. The gate control for selecting a portion of the received signal related to a selected distance from the borehole effectively acts as a control for selecting the distance from the borehole at which a search for an interface takes place.

A simulator is also provided for simulating a radar signal transmitted into a geological formation. The simulator comprises a pseudo code generator for producing a transmitted signal comprising a plurality of digital pulses and a plurality of selectable time delay elements. A filter is provided having a response related to the geological formation and a gating control is used for selecting a gated portion of a returned signal related to a selected distance into the geological formation.

In a preferred embodiment, the filter further comprises a Butterworth bandpass filter. A plurality of selectable attenuators are provided for respective of the plurality of selectable time delay elements. A noise generator is used to produce noise in the simulated received signal. An analog to digital converter is used in the simulator for receiving the transmitted signal from the filter to produce the returned signal. An accumulator stores the gated portion of the returned signal.

A method is also provided for controlling a producing zone in a geological formation of a well having a plurality of producing zones. The method comprises steps such as transmitting a plurality of pulses into the geological formation and receiving the reflections from the plurality of pulses due to a waterfront approaching within the producing zone. The waterfront is detected from the reflections and the producing zone is closed down. The method may typically involve selectively controlling the carrier frequency at frequencies below 1 MHz. The method typically requires selecting the one or more reflections from the waterfront by providing a delay. The detected reflections are then correlated with a stored signal containing a sequence for the plurality of pulses.

An antenna is positioned within the well for the transmitting of the plurality of pulses into the geological formation. A non-ferrous wellbore tubular such as plastic casing or liner permits the transmitting of the plurality of pulses into the geological formation from within the well.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PREFERRED EMBODIMENTS

The present invention provides apparatus and methods for a ground penetrating radar with a pulsed pseudo noise code transceiver. Pseudo noise as referred to herein is a random recursive digital sequence, e.g., a random digital repeating sequence. When broadcast, the signal is spread over a wide range of frequencies so that at any particular frequency the signal may appear to be background noise or a pseudo noise.

Figure 1:
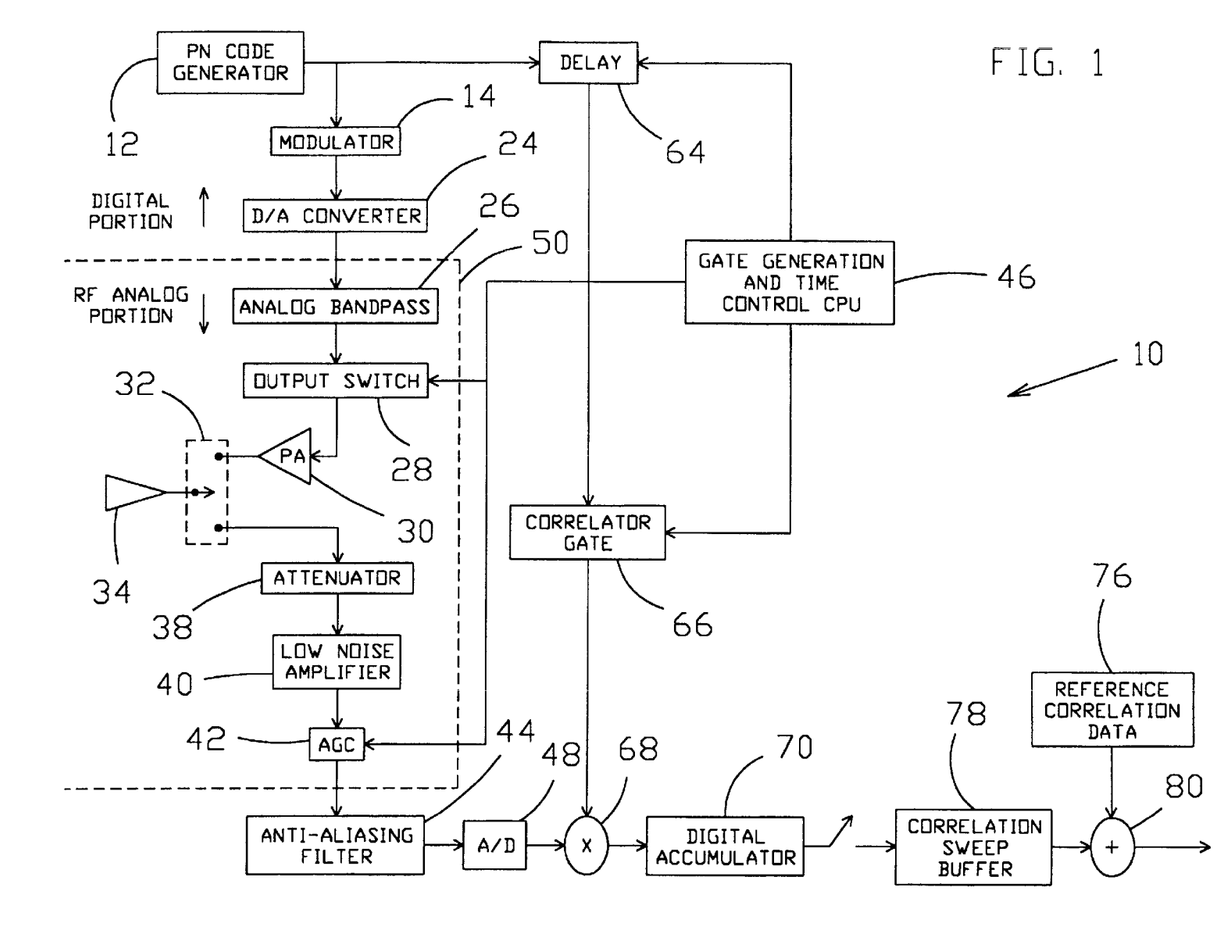
FIG. 1 is a schematic with a block diagram showing a transceiver for transmitting and receiving signals in accord with the present invention.

Referring now to the drawings, and more particularly to FIG. 1, there is shown a ground penetrating transceiver or georadar 10 in accord with the present invention. The use of an extremely long PN code, when needed, allows the generation of virtually unlimited transmission of energy thereby making detection of extremely low power reflections possible. Pseudo noise code generator 12 is used to create a sequence of code that is selectable in length. The length of the PN code is configurable depending upon how much processing gain is needed to extract the signal from the received signal and associated noise. Longer codes require longer detection time. Generally, time is available for long codes because of stationary or slowly moving interfaces to be detected, such as a slowly moving waterfront. When desired, a georadar tool may be positioned in a stationary position, such as a borehole, from minutes to days as needed to produce the necessary processing gain. Note that invasion effects, discussed earlier, tend to be located within one or two meters from the borehole so that the results may be obtained much more quickly and that a georadar may be slowly moved or moved in relatively short term stations, assuming the conditions were conducive to higher gain.

Modulator 14 may be, if desired, an all-digital element that produces a signal at a selected carrier frequency that contains the pseudo code. Thus, in one preferred embodiment, nonlinear elements such as mixers or analog carriers are not necessary although analog components could be used for modulator 14 if desired whereby a sine wave carrier generator, or the like, could be modulated. The signal from a preferred embodiment of modulator 14 is a series of digital pulses with the ones and zeroes being distinguished by phase shifting. Because PN Code Generator 12 and modulator 14 are preferably all digital, they can be easily programmed and reconfigured for various types of operation. By all digital is meant they produce a digital signal that has a few discrete values, such as ones and zeros which may be represented by phase shifts, rather than a wide range of values, such as an infinite number of values within a range, that would typically be produced by an analog system.

Depending on the processing gain necessary, a long string of pulses, with each pulse having a duration of a few or one RF cycle may be chosen. The string of pulses is configurable and is dependent primarily on the choice of carrier frequency. The spacing 16 (FIG. 5) between pulses 18 can be made configurable based on the target range. Thus, if the target is closer then spacing 16 may also be closer if desired.

Figure 5:
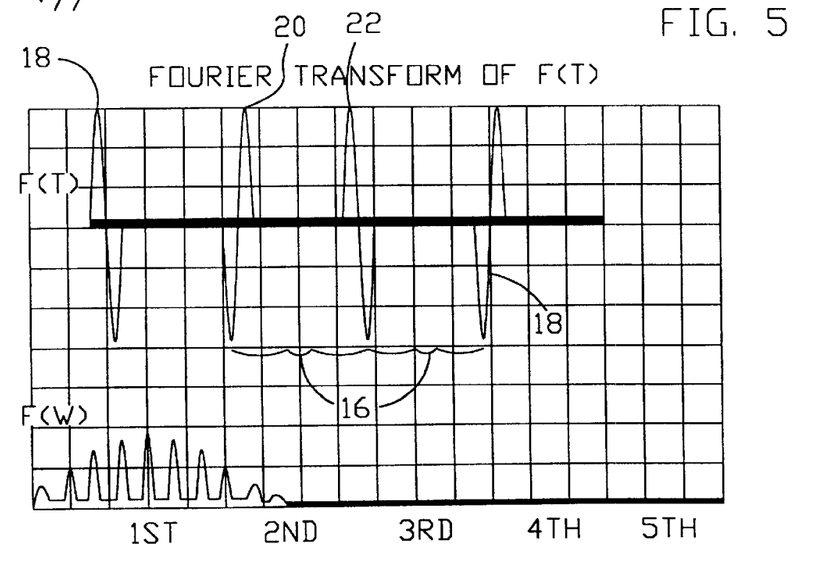
FIG. 5 is a graph that shows four pulses of a pseudo noise code in accord with the present invention.

In a presently preferred embodiment, georadar 10 uses pseudo noise (PN) code that is preferably phase modulated to provide a plurality of transmitted pulses. Each pulse carries a "1" or a "0" depending upon its phase state. For example, pulse 20 may be a "1" as compared to a respectively phase shifted pulse 22 which may be designated as a "0."

Digital to analog converter (D/A converter) 24 may be used to produce an analog signal that is applied to analog bandpass filter 26 and may appear similar to the waveform of FIG. 5. Analog bandpass filter 26 could also be a digital filter, if desired. Following signal flow, when gating control circuit activates output switch 28 for signal transmission, then the analog signal is applied to power amplifier 30, through switch 32, and broadcast into the formation by antenna 34.

The first four pulses of a pseudo noise code to be transmitted are shown in FIG. 5 along with the Fourier Transform of this four bit code sequence. Since the majority of the broadcast spectrum extends from 0 to 2 MHz, there will be considerable spectral distortion across this bandwidth. The received spectrum will be attenuated more on the high frequency end and less on the low frequency end of the spectrum. The amount of attenuation varies with the formation conductivity and the carrier frequency. The receiver front end filters, such as anti-aliasing filter 44, will be designed to take this effect into account and are preferably digitally adjustable to vary as conditions change. Thus, if different production zones or different wells had different conductivities, then georadar tool 10 components such as anti-aliasing filter 44 could be programmed accordingly. The measured value of conductivity, permittivity, and the like are typically available so that anti-aliasing filter 44 may be programmed accordingly. As stated above, bandpass filter 26 may also be adjustable if desired to control such effects.

Attenuator 38, if used, is preferably an adjustable attenuator and, if present in the desired configuration, may be used to reduce relatively higher power signal returns that may be reflected from interfaces closer to the borehole or antenna 34. Low noise amplifier 40 receives the signal from attenuator 38 and applies it to automatic gain control (AGC) 42 which automatically adjusts the signal level to a desired setting and may, if desired, be controlled by gate generation element 46. The gain of automatic gain control may be controlled either initially or finally by a signal from gate generation and time control CPU 46. Thus, automatic gain control 42 may operate by itself to provide a desired level of gain, or element 46 may provide an initial setting based on the expected receiver signal with self adjustments made by automatic gain circuit 42, or element 46 may control the gain of automatic gain circuit 42 completely as desired. Attenuator 38 and automatic gain control (AGC) 42 may be controlled by element 46 and may work in cooperation to produce the desired signal output level. Automatic gain control (AGC) 42 applies the received signal from the formation to anti-aliasing filter 44, which is designed to adjust the frequency response of the received signal. As discussed below, the information of FIG. 2 and FIG. 3 may be used to control anti-aliasing filter 44 to compensate for plane loss and dispersion for formations of differing conductivities and use of different carrier frequencies.

The signal is then applied to analog to digital unit (A/D) 48. A/D 48 samples the received signal to thereby transform the received signal from an analog to a digital signal for subsequent detection. The faster the PN code can be sampled at the receiver such as at analog to digital element 48, the better the system's ability to detect variations in the reflection return time and therefore the better the range accuracy and resolution. Thus, the present system resolution is determined by sampling rate rather than system bandwidth. Sampling the PN code at 5 to 50 times faster than the PN code can generally be accomplished, e.g., the sampling frequency is greater than the carrier frequency and preferably 5 to 50 times faster. If the carrier frequency is 1 MHz, then the sampling frequency is preferably at least 5 MHz to 50 MHz. Sampling the PN code at 5 to 50 times faster than the carrier frequency using A/D 48 is one means for producing a received digital signal as well as increasing the accuracy and resolution of detecting a movable liquid body interface in a geological formation. The shape of the correlation function is not affected by over sampling. Correlation is a process of measuring the similarity of an incoming signal with a stored reference code. A correlator may be a hardware component or a computer sequence or program used for this purpose so as to detect a spread spectrum signal. Spread spectrum refers to a communication technique that spreads a signal bandwidth over a wide range of frequencies for transmission, such as by broadcasting a pseudo noise code, and then de-spreads it to the original data bandwidth at the receiver. Auto correlation is a measure of the similarity between a signal and a time-shifted replica of itself, a special case of cross-correlation. Over sampling does not have much impact on the coding gain, nor does it change the pulse width of the correlation's main peak. These parameters are still controlled by the length of the PN code and the chip rate of the PN code transmission. Over sampling provides more resolution, which will improve the systems ability to detect small variations in the time delay of subterranean reflections.

Automatic gain control 42, like output switch 28, is preferably controlled by gate generation and time control CPU 46 so that the transmitted and received signals are sent and received during selected coordinated time periods and the necessary gain is given to the signal based on the time interval selected for viewing the received signal. The proposed detection technique incorporates a pulsed pseudo noise transmit signal with a gated receiver window applied to AGC 42 to optimize the dynamic range performance of the detection hardware. Thus, the transmitter comprising sections 12, 14, 24, 26, 28, and 30 is pulsed and the receiver comprising sections 38, 40, 42, 44, and 48 is gated to reduce the chance that the high power and short delay of close reflections will degrade the receiver's response to the very low power reflections of distance interfaces. Reflections generated close to the receiver may be 160 dBm greater than reflections generated 50 meters away from the receiver. If the transmitter were to be continuous wave, this would place extreme requirements on the performance of the receiver's input circuitry. Building a receiver capable of resolving inputs with this degree of amplitude variation is not considered practical. Rather than attempting to build a receiver with 160 dBm of dynamic range, the present invention preferably utilizes a combination of gating using gate generation block 46 to control the various gated elements, automatic gain control (AGC) 42, and all-digital pseudo noise PN transmit pulse modulation 12 and 14 elements. By using these techniques, the receiver can look for reflections in the time period after each PN pulse, when the transmitter is switched off. If the receiver input is intelligently gated for the specific application, the receiver can meet the dynamic range requirement by using automatic gain control (AGC) 42 and/or controlling variable attenuator 38 in front of the LNA 40.

In the present invention, carrier frequencies well below 1 MHz can be used in lower resistivity (high conductivity) media as is highly desirable to facilitate formation penetration. For instance, it is anticipated that carrier frequencies at least as low as 100 KHz could be used. Carrier frequencies above 1 MHz can also be used in high resistivity (low conductivity) media to facilitate range resolution and angle resolution.

Figure 2:
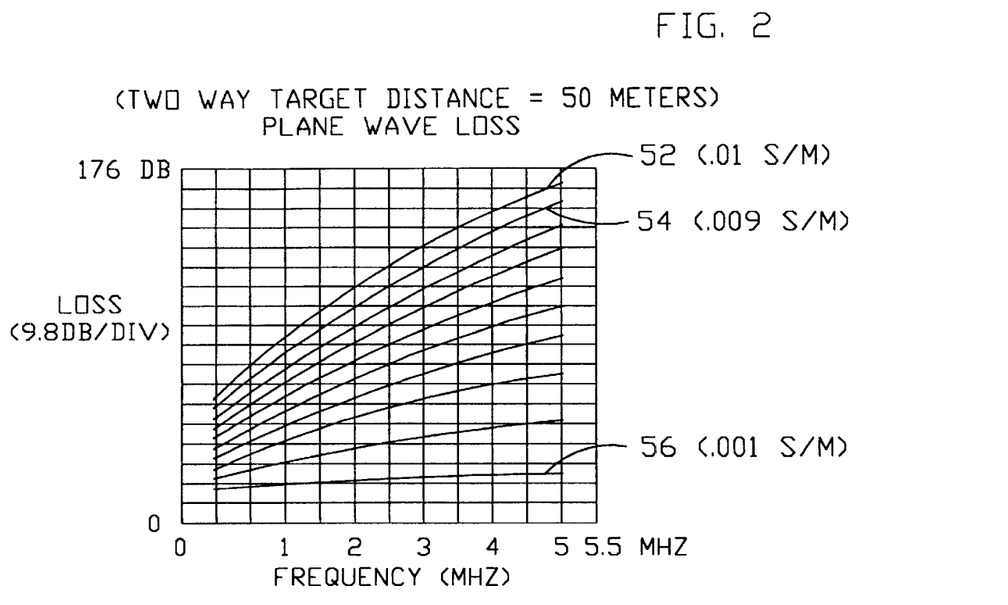
FIG. 2 is a graph that relates frequency with plane wave loss for selected formation conductivities.

The predominate factor in the choice of carrier frequency is the conductivity of the medium into which the radar system must operate. The carrier frequency can be made configurable depending upon the application. As shown in FIG. 2, lower frequencies generally penetrate lossy media better than high frequencies. A wide range of conductivity may be anticipated for various down-hole environments. The information of FIG. 2 and FIG. 3 may be used to control anti-aliasing filter 44 to compensate for plane loss and dispersion for formations of differing conductivities and use of different carrier frequencies.

A baseline environment is assumed to be a conductivity of 0.01 S/m (resistivity of 100 ohmmeters) and a relative permittivity of 9. However, wide variations from this baseline can be accommodated by the system of the present invention. From FIG. 2, an average medium loss for 50 meters (two way) at a frequency of 1 MHz is approximately 82 dB for a plane wave in a homogeneous medium. This does not include beam-spreading loss. Curve 52 represents plane wave loss when the formation conductivity is 0.01 S/m (100 ohmmeters). Curve 54 represents plane wave loss when the formation conductivity is 0.009 S/m. Continuing in the same manner such that the next curve has a formation conductivity of 0.008 S/m and so forth, then curve 56 represents plane wave loss when formation conductivity is 0.001 S/m (1000 ohm-meters).

Figure 3:
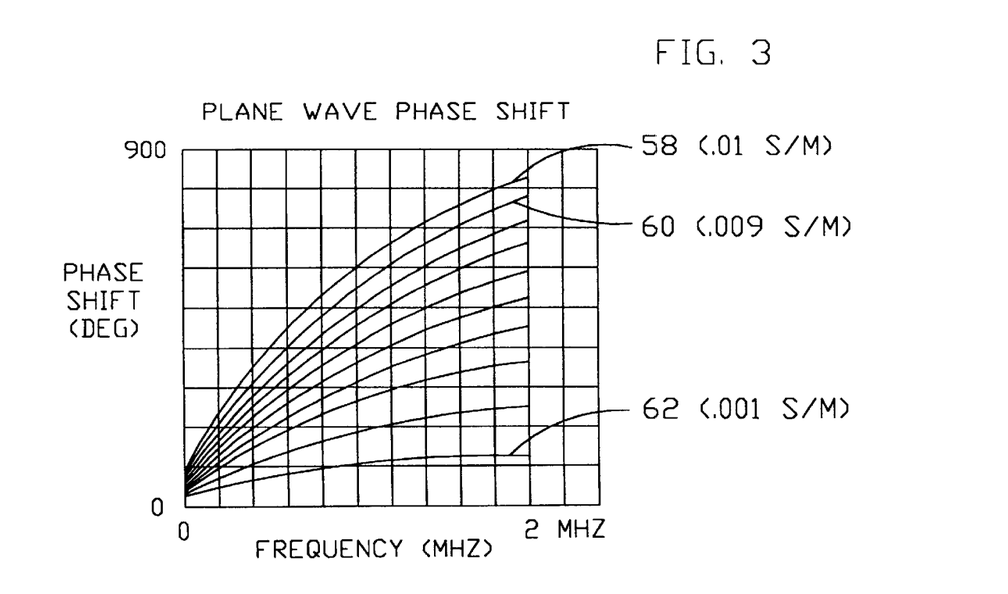
FIG. 3 is a graph that relates frequency with plane wave phase shift for selected formation conductivities.

Medium losses due to transmission through the selected downhole geological formation force the use of unusually low frequencies for a radar system. The medium is dispersive at these same low frequencies and this distorts the spectrum of the transmitted waveform. The distortion to the received signal must be considered in the overall system design. FIG. 3 shows that plane wave phase dispersion is worse for higher conductivities.

Curve 58 shows plane wave phase shift for a target 25 meters away (two way 50 meters) in a homogeneous formation having a conductivity of 0.01 S/m. Curve 60 shows plane wave phase shift in a formation having a conductivity of 0.009 S/m, with the next curve being 0.008 and so forth. Likewise, curve 62 shows plane wave phase shift in a formation having a conductivity of 0.001 S/m. Also, the velocity of propagation slows down as the medium becomes more lossy. However, the slowing down of propagation velocity actually improves range measurement accuracy and range resolution accuracy.

Figure 4:
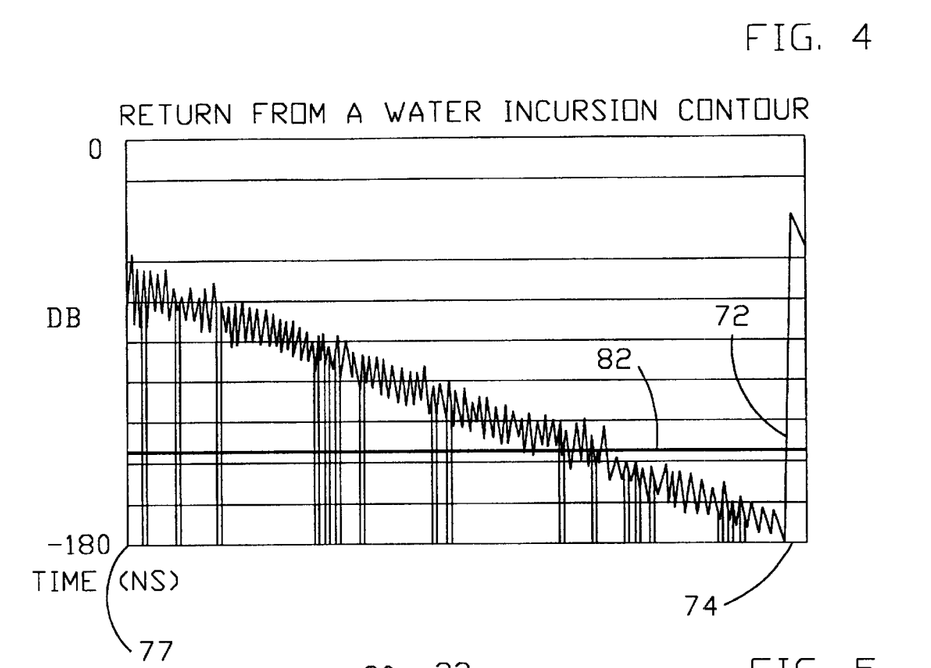
FIG. 4 is a graph that shows a water incursion contour in accord with the present invention.

The lithography surrounding a bore hole is generally not homogeneous but, in fact, consists of many layers of various rocks and sand, oil, water mixtures. Each discontinuity in the medium causes energy to be reflected back to the radar. Reflected energy from near in is generally at a much higher level than reflected energy from further away. It is desirable to see the water incursion from as far away as the radar system can perform. FIG. 4 provides an example of the returned signal from one possible lithography. The ordinate shows the returned signal level in dB and is scaled at 20 dB per division. The abscissa shows time delay in nanoseconds with right edge 74 of the plot, in this case, being 7510.9 nanoseconds. The width of the gate is selectable so left edge 77 of the plot could be of various values as desired. The width of the gate between left edge 77 and right edge 74 and the specific starting time and ending time of the gate are controlled by gate generation and time control CPU 46, through programmable delay element 64, and the received signal within the gate is selected by a signal from correlator gate 66 whose signal controls gate element 68 which applies the desired data within the beginning and end time of the gate into digital accumulator 70. Note that in order to achieve high processing gains, that significant time, perhaps a week, may be required which is permissible when used, for instance, for detecting an approaching waterfront from a good distance. Delay element 64 is effectively a distance selection element that provides a programmable delay for selecting the distance at which transceiver 10 will look for an interface. Once data has accumulated in digital accumulator 70, then the data is transferred to correlation sweep buffer 78 as indicated by the switch prior to correlation sweep buffer 78. Reference correlation data from pseudo code generator 12 is also sent to reference correlation data block 76 where it is compared in autocorrelator 80 for a match found with data from correlation sweep buffer 78 received during the gated period. One advantage of the present invention is that the autocorrelation between the information of data block 76 and correlation sweep buffer 78 provide very strong correlation peaks associated with long pseudo noise codes that can be used to discriminate against reflected signals from other ranges not currently being measured.

In FIG. 4, the abscissa also represents range to the various reflections and to the approaching waterfront. Right edge 74 of the plot is 35 meters. Near right edge 74 of the plot, the reflected energy from waterfront 72 is shown. Although not shown, additional information may preferably be included on the plot such as some of the characteristics of the lithography including:

(a) numbers of layers
(b) average relative permittivity
(c) average conductivity
(d) average wavelength
(e) average attenuation constant
(f) average phase shift constant Also certain assumptions about the calculations associated with the radar system may be provided such as:

(a) the reflecting area of the approaching water front
(b) transmitter power
(c) antenna gain
(d) RF circuit losses
(e) system bandwidth (expressed in dB)
(f) down-hole temperature
(g) minimum signal that will provide reliable detection (e.g., 13 dB signal to noise ratio)

A horizontal line 82 is drawn at the minimum signal level to show regions of the reflected signal plot that are detectable and regions that are not.

Figure 6A:
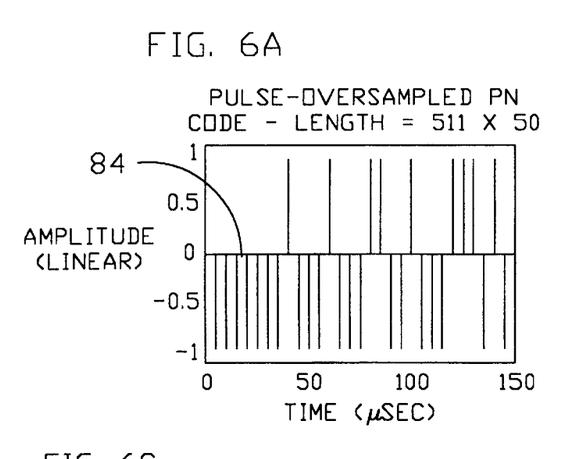
FIG. 6A is a graph showing a pulse modulated pseudo noise code versus time for the first one hundred fifty microseconds.
Figure 6B:
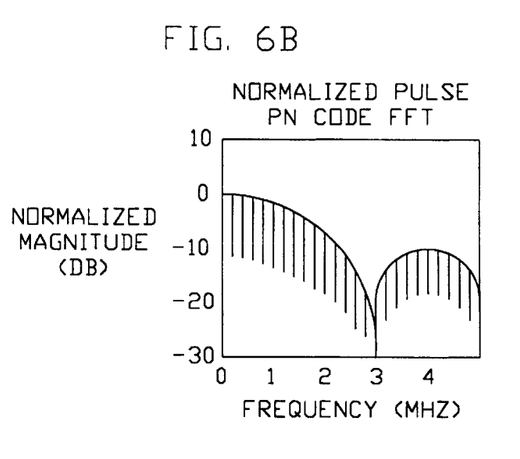
FIG. 6B is a graph showing the fast Fourier transform of the signal of FIG. 6A.
Figure 6C:
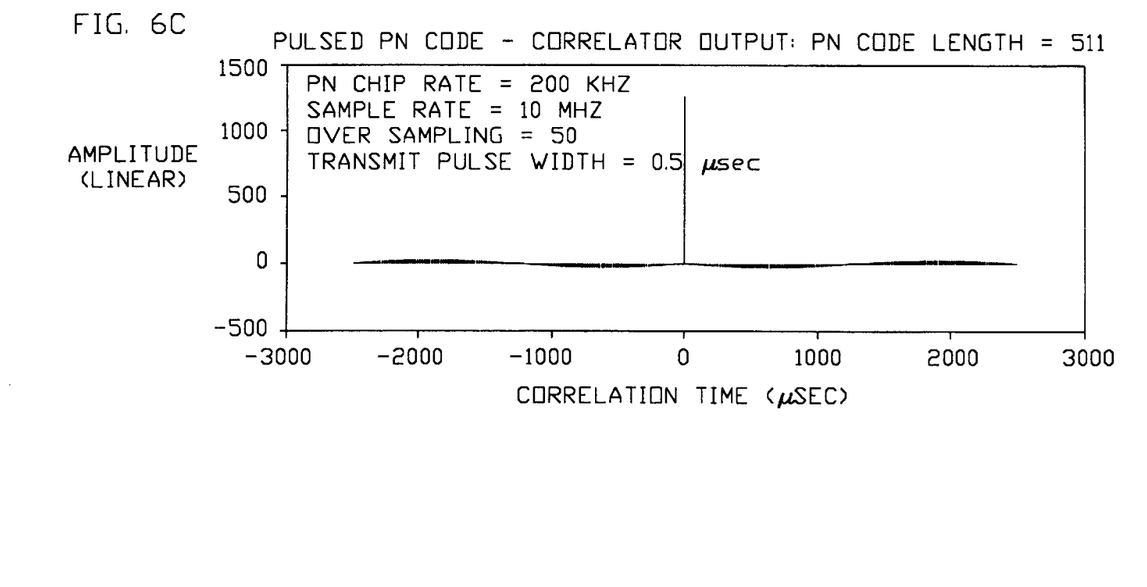
FIG. 6C is a graph showing the autocorrelation of the signal of FIG. 6A.

Elements of the PN pulse modulation technique in accord with the present invention are shown in FIG. 6A through FIG. 6B. A short code is chosen only as an example. FIG. 6A shows the pulse modulated PN code 84 versus time for the first 150 nsec. This is the signal produced from A/D 48 and is over sampled by a factor of 50 times. FIG. 6B shows the PN code fast Fourier transform versus frequency out to half the sample rate. FIG. 6C shows the pulsed modulated PN code autocorrelation function versus correlation time.

Figure 8:
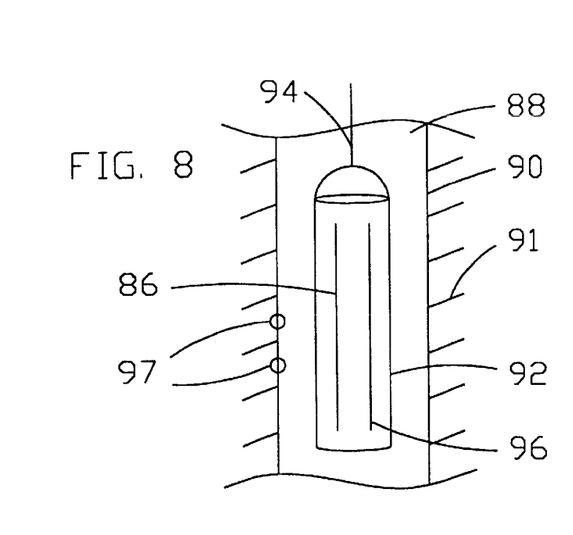
FIG. 8 is a schematic of a logging tool with multiple antennas in a downhole environment in accord with the present invention.

Antennas in the frequency regime of 100 KHz to 10 MHz would generally be expected to be quite large in order to be efficient. This would be the case if radiating into air. However, when radiating into a lossy medium, the size requirement is greatly reduced. If a dipole antenna is used for antenna 34 in FIG. 1, such as dipole antenna 86 shown in FIG. 8 mounted within downhole tool 92, then the dipole antenna can be placed parallel with borehole 88 adjacent to casing or liner 90, e.g. wellbore tubular, within geological formation 91. In one embodiment of the invention, the wellbore tubular such as casing or liner 90 may be made from plastic, non-ferrous, or other materials which are relatively transparent to signals at the transmission carrier frequencies rather than steel as is customary for casing. Geological formation 91 may often include an invaded zone and/or a reservoir water front which it would be desirable to detect. In this example, tool 92 may be a downhole tool supported in borehole 88 by wireline 94 or by well bore tubulars such as tubing or drill pipe. In another embodiment of the invention, an antenna may be inserted into formation 91 through holes 97, which may be perforation holes, slots in a liner, or an opening in the casing. A cable may be threaded between two holes 97, if desired. While the invention is discussed in terms of use within a borehole, the invention is highly adaptable and may be used for other purposes such as on an ocean floor or the like.

Figure 7:
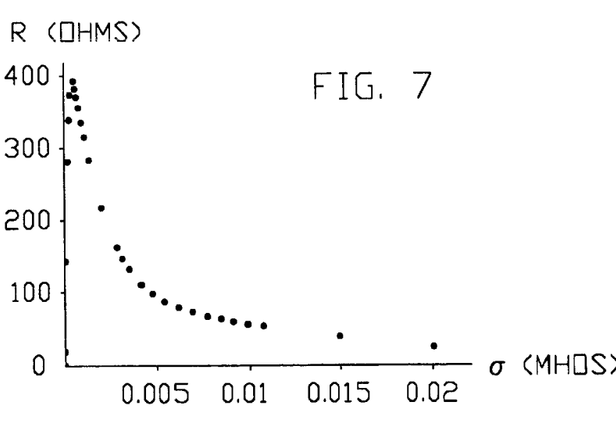
FIG. 7 is a graph of antenna resistance versus formation conductivity for transmission at 1 MHz.

At a frequency of 1 MHz and a total length for the antenna of 4 meters, the input impedance is a very good match to common coaxial cables over a wide range of media conductivities. For an example, the radius of antenna 86 may be one centimeter and the radius of tool 92 ten centimeters so as to permit tool 92 to contain any necessary downhole electronics, and perhaps the entire system 10. Data, power, and/or other signals could be transmitted through wireline 94, as desired. For the calculations shown in FIG. 7, the relative permittivity of the formation may be approximately 10. The antenna input impedance for this situation is shown in FIG. 7 for input impedance versus formation conductivity when broadcasting at 1 MHz. The input impedance is quite broad banded so that little degradation will occur when transmitting or receiving a spectrum that extends from 0.5 MHz to 1.5 MHz.

Although, the system of transceiver 10 could be designed with separate send and receive antennas, control elements such as transmit/receive switch 32 are configured so the receiver front end is never open while transmitting. Using a single antenna 34 (FIG. 1) or 86 (FIG. 8) reduces cost and minimizes packaging and complexity. However, where desired, multiple antennas, which may be used as an array, may be used for gaining some angular resolution to the target in one dimension. Thus, additional antennas such as antenna 96 and others may be provided. Multiple radar systems at various distances along the borehole, such as lengthwise-arranged arrays, can also accomplish this objective. Moreover, antennas could be mounted externally to downhole tool 92 such as along cable 94 which may be provided with a cable electrode that contains one or more dipole antennas that may be of practically any length, that may be stacked with respect to each other, which may be of varying lengths, which may be parallel to each other, which may be surrounded by an elastomer coating, and the like.

Figure 9:
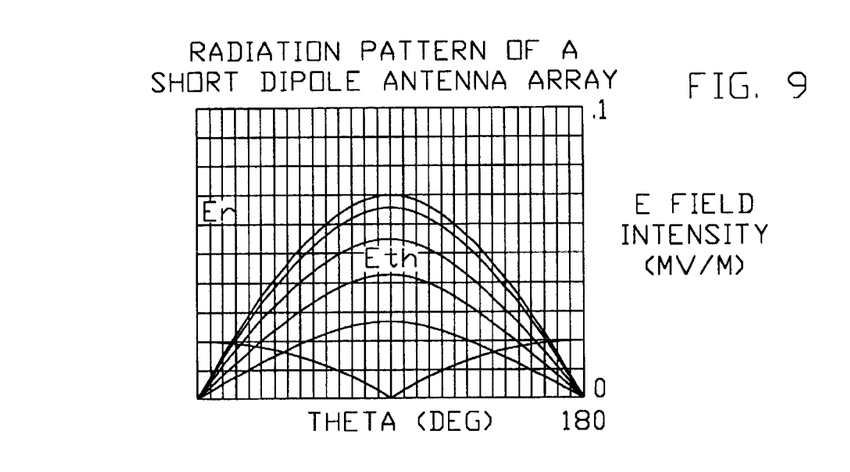
FIG. 9 is a graph showing antenna radiation at twenty meters from a short dipole antenna array in a lossy medium in accord with the present invention.

The target (reflected energy from the water incursion) is generally close with respect to a single wavelength and is therefore in the near field of the antenna. Therefore, the radiation pattern of the antenna must include near field terms as well as the commonly used far field terms. FIG. 9 shows that at 20 meters, the end fire radiation Er from the dipole is not negligible and both Er and Eθ are time varying field and are not in phase. These factors must be considered in determining how the waterfront or other interface is illuminated during a short transmit pulse.

Figure 10:
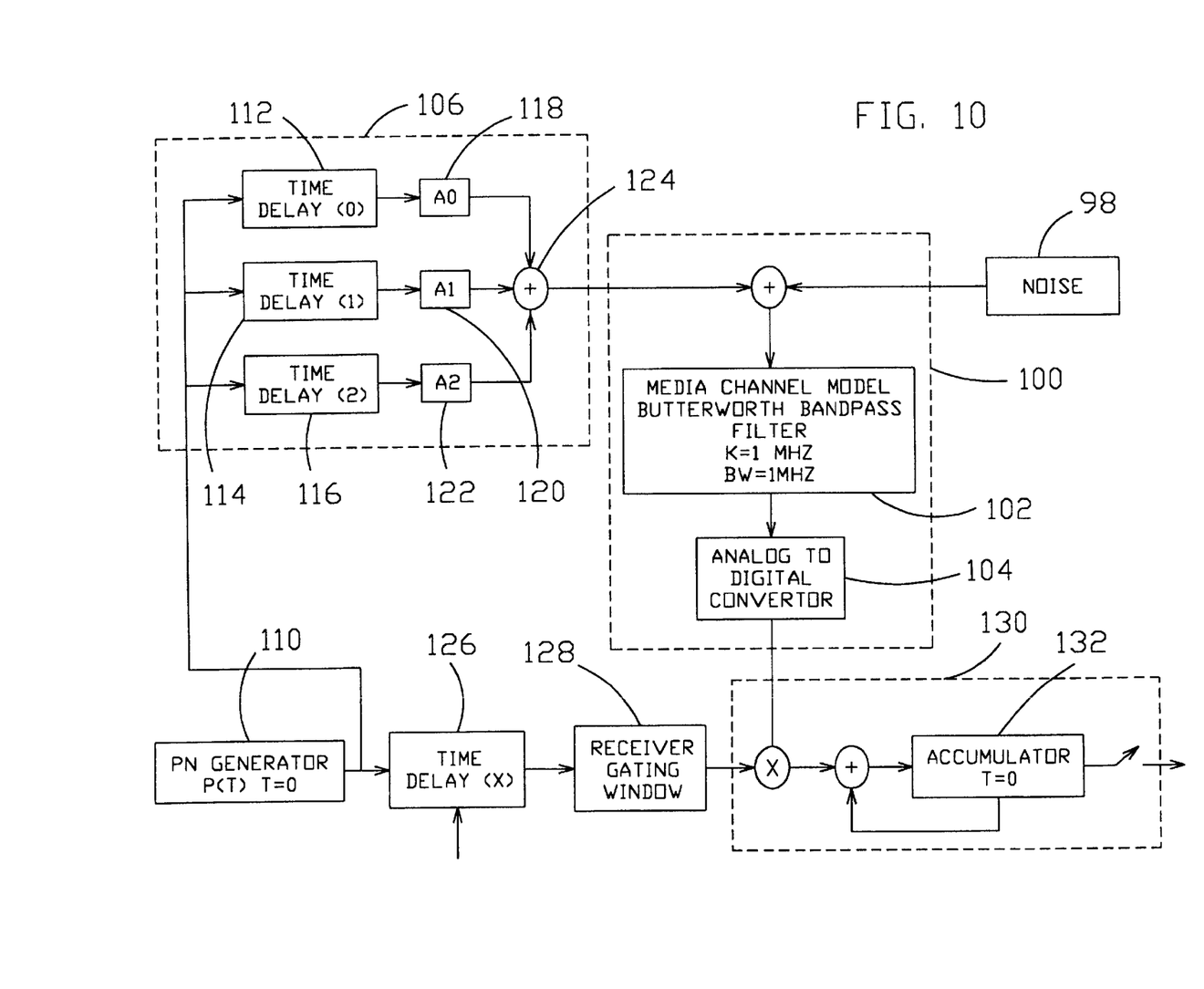
FIG. 10 is a schematic showing a simulation model of a pseudo noise cross correlator in accord with the present invention.

The present invention also comprises a simulation model so that transceiver 10 may be tested for operation under various conditions and circumstances. For instance, additive noise, channel distortion, and receiver A/D quantization have been added to a simulation model to study the effect of expected distortion mechanisms on this system. The model is illustrated in FIG. 10. The power of the additive white Gaussian noise may be approximately −50 dBm and is produced by white noise generator 98. Within media channel model 100, a fourth order Butterworth filter 102 with 1 MHz bandwidth and center frequency is used to model channel distortion of the downhole formation. In one preferred embodiment, the model uses a 12-bit analog to digital converter 104 running at 50 MHz sample rate.

Figure 11A:
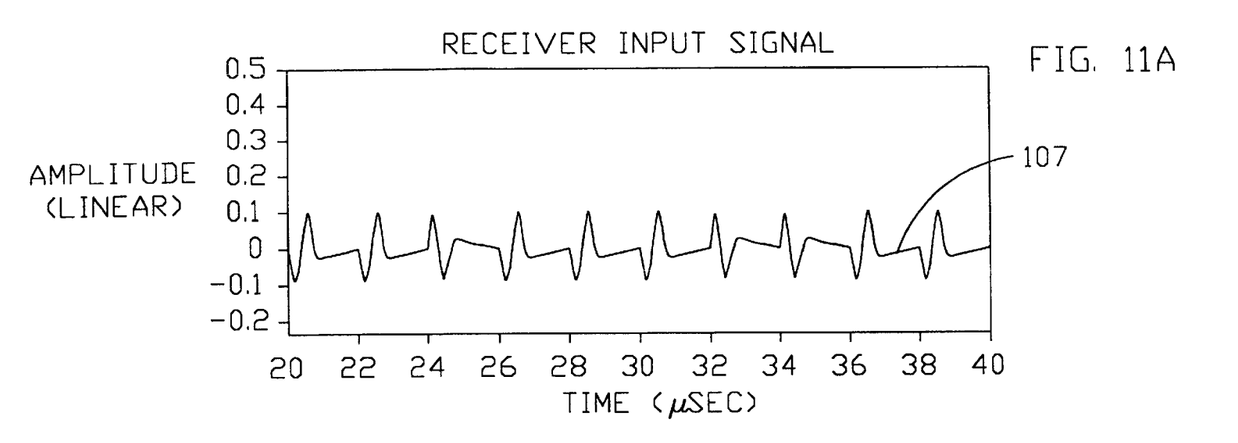
FIG. 11A is a graph showing a simulated receiver input signal in accord with the present invention using the simulation model of FIG. 10.
Figure 11B:
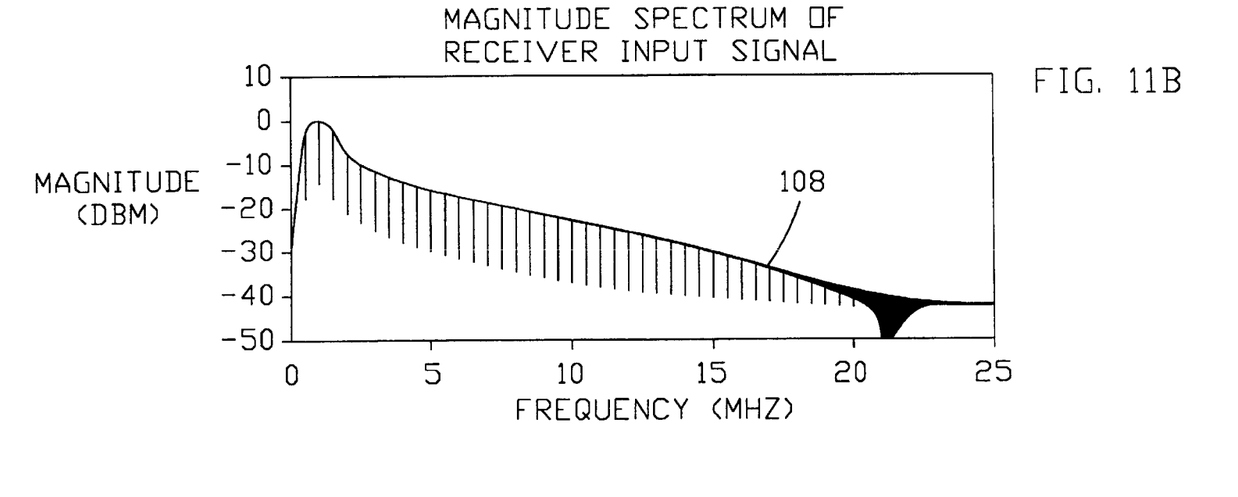
FIG. 11B is a graph of the magnitude spectrum of the signal of FIG. 11A.

FIG. 11A shows the receiver input signal of transmitted PN pulse code 107 after passing through channel filter 102. The pulse code is initially generated at PN Generator 110. The pulse spreading that occurs during propagation is unavoidable. The spectrum 108 of the received PN pulse code is shown in FIG. 11B. Filter 102 is intended to illustrate the effects of frequency limitation. The actual media response is roughly simulated using a Butterworth filter.

Reflection model 106 may be used to provide various simulated formation reflections. In this example, three formation reflections are used with selectable time delays from time delay units 112, 114, and 116 but many more may be used as desired. Units 118, 120, and 122 each produce a selectable change in signal power. The plurality of simulated reflections are added by adder element 124. In the example, the system's ability to resolve movement of interfaces close to the transceiver is simulated in the presence of the three noise mechanisms.

In one test, a multi-reflection simulation was run in which the second reflection has a time delay of 200 nsec in case 1 and 150 nsec in case 2. The amplitude of the second reflection is −15 dBm for both cases. In each case, the first reflection is at 800 nsec with amplitude −10 dBm. The PN chip rate is 500 KHz, the PN codes transmit pulse width is 50 nsec, and the receiver A/D sample rate is 50 MHz. The receiver time resolution and gating window are 20 nsec as selectively controlled by time delay 126 and receiver gating window 128, making the system's distance resolution approximately 1 meter. Correlator accumulator model 130 produces the cross-correlation at time $t_c$ of the media channel output from 100, q(t), and the delayed receiver gating window w(t) output from 126 and 128, which is synchronized to the PN reference code. As $t_c$ varies from −T to T using accumulator 132, the complete cross-correlation function is generated.

Figure 12:
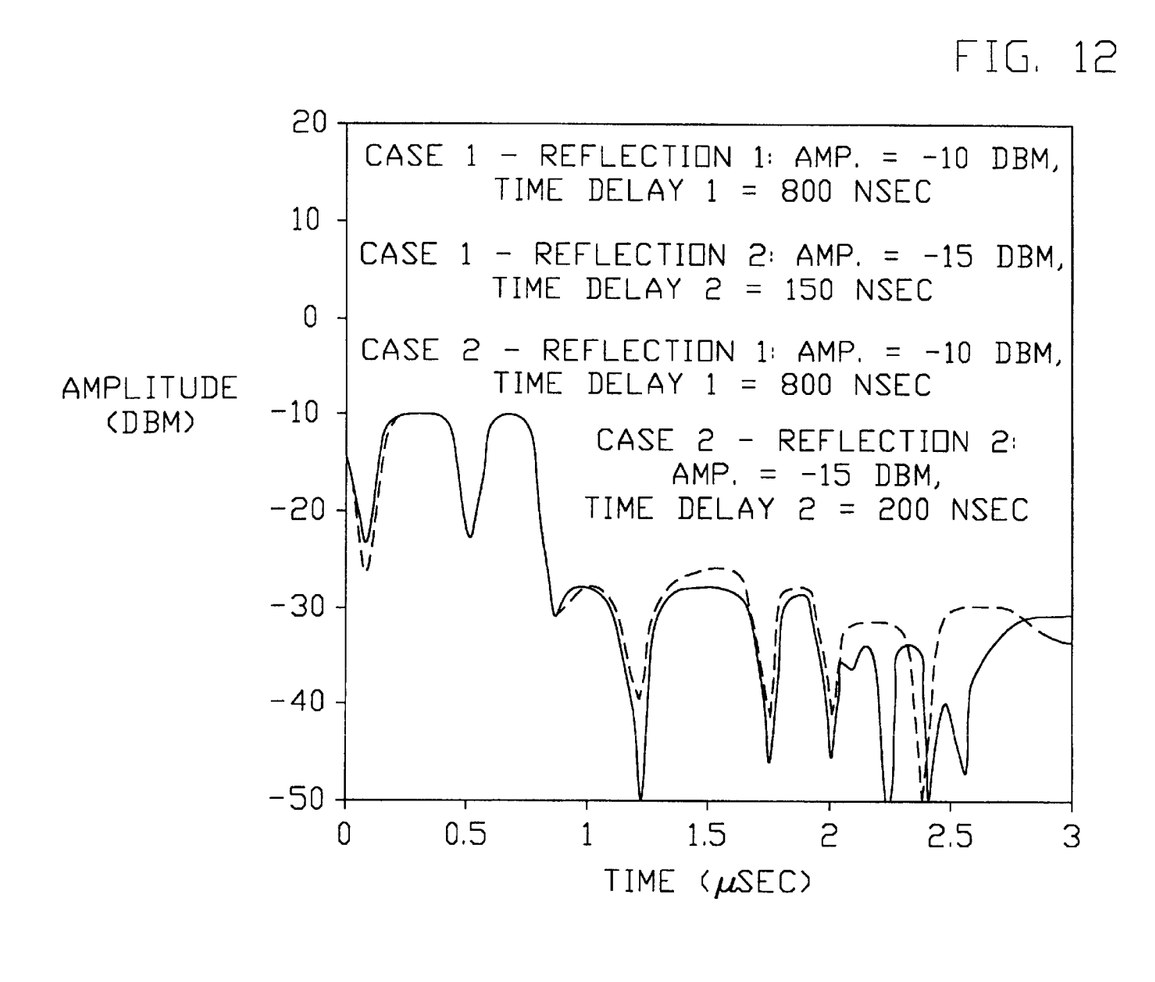
FIG. 12 is a graph showing correlator outputs for two multi-reflections simulations.
Figure 13:
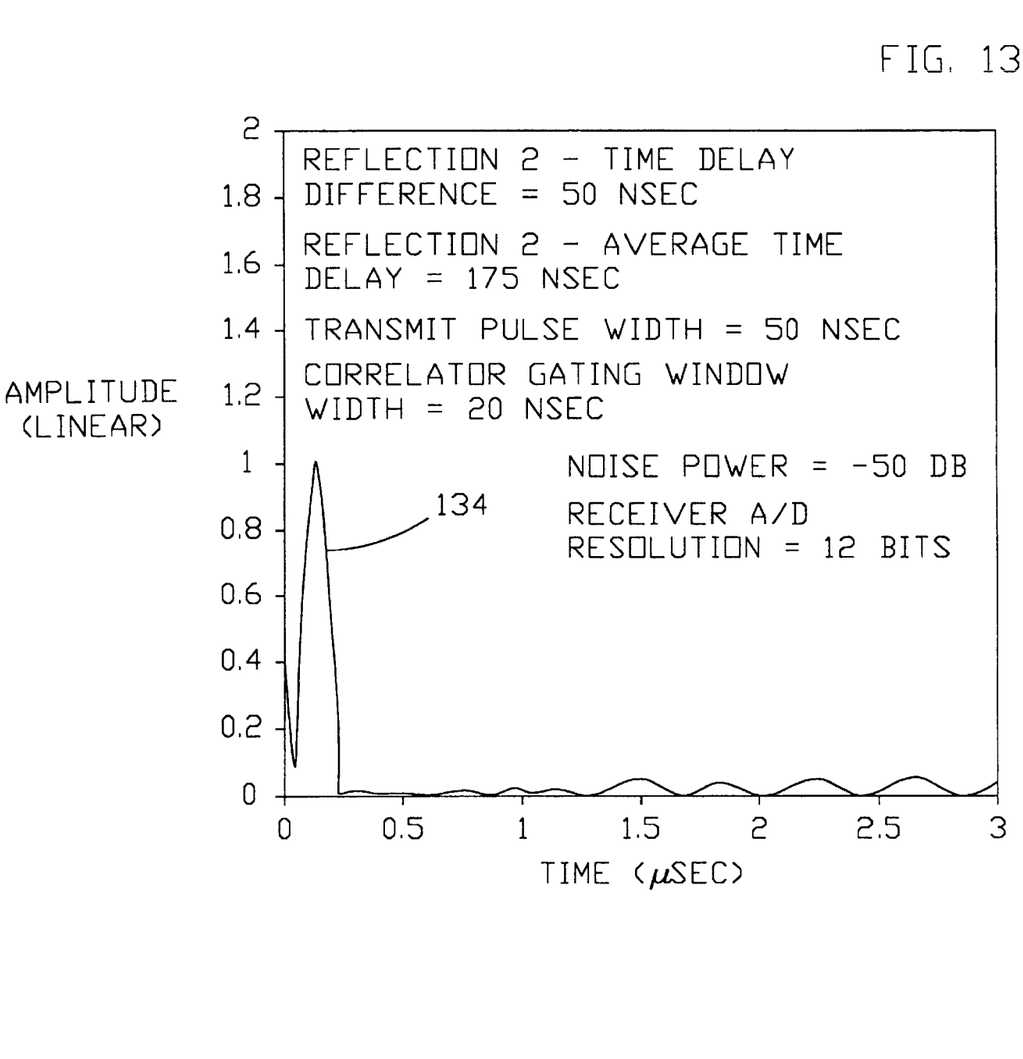
FIG. 13 is graph showing the correlator differential output for the case of FIG. 12.

FIGS. 12 and 13 illustrate the cross correlation outputs and the differential function, for the two cases. The differential plot of FIG. 13 shows the movement of reflector 2, from 200 nsec time delay to 150 nsec. In the presence of noise, what would normally be a double peak, is now a single peak 134 centered around a time delay of 175 nsec. The sample rate of 50 MHz cannot compensate for the distortion mechanisms introduced into the model. The pulse spreading caused by channel filter 102, is responsible for the loss of the double peak. The addition of noise and A/D quantization has raised the noise floor on the differential plot, illustrating the need for very long PN codes. Despite the loss in resolution, the single peak is more than adequate for detecting the movement of the reflected energy in accord with the present invention.

Georadar 10 is configurable to function in a wide variety of geological formations that may be encountered at depths of thousands of meters or at shallow depths or from the surface. The radar is nearly all digital, as indicated by dashed section line 50 that effectively separates substantially digital and substantially analog elements. The digital portions are easily programmable and configurable although analog elements may also be digitally controllable, e.g., adjustment of attenuator 38, gain of AGC 42, and power output of power amplifier 30. The information from georadar 10 can be used with known data such as previously logged conductivity and permittivity data for controlling loss and phase shift by use of attenuator 38 and/or AGC 42 and/or anti-aliasing filter 44. Georadar 10 can be made rugged to survive the temperatures and pressures of down-hole environments.

Georadar 10 may be used detect a slowly approaching water front, a change of formation invasion depths, or a change in formation fluids or gases. For this purpose, a comparison of current measurements with previous measurements may be made to determine the differences. The difference processing can be done at a surface facility.

The requirements of the radar system for the water incursion application are such that many other applications are possible. This includes mapping geological formations tracking the movement of water in reservoirs. Some applications may be best accomplished using multiple radar systems yielding multiple range measurements.

The present invention provides perhaps the only tool available to directly measure the depth of invasion. Normally, open hole tools require at least two sensors of the same type but with different radial scopes, e.g., a dual laterolog or a dual neutron to compensate for the effects of invasion which are unknown during downhole. The present invention may be used for more accurate determinations of readings from presently available downhole tools by providing a direct measurement of the invasion effects.

In operation, the tool may be suspended stationary for extended times, perhaps a week, to detect relatively slow moving waterfronts some distance from the borehole. Digital accumulator 70 may be used to accumulate digital information from the transmitted and received signal. For detecting invasion profiles, which are generally quite close to the borehole, the tool may be able to be pulled slowly or stopped at stations providing readings along the borehole as desired.

Therefore, the foregoing disclosure and description of the invention are illustrative and explanatory thereof, and various changes in the method steps and also the details of the apparatus may be made within the scope of the appended claims without departing from the spirit of the invention.

What is claimed is:

1. A method for detecting interfaces in an earth formation, comprising:

generating a plurality of digital pulses;

producing said plurality of digital pulses at a carrier frequency;

transmitting said plurality of digital pulses into said geological formation from a first physical position;

detecting a received signal comprised of reflections from said geological formation due to said transmitting of said plurality of digital pulses;

over sampling said received signal such that a sampling rate is greater than five times said carrier frequency to produce a digitized received signal;

gating said digitized received signal for selecting a selected time frame of said received signal to produce a gated digitized received signal;

correlating said plurality of digital pulses with said gated digitized received signal for detecting an interface at a selected distance from said first physical position.

2. The method of claim 1, further comprising:

utilizing a carrier frequency in the range from 100 KHz to 1 MHz.

3. The method of claim 1, further comprising accumulating said plurality of digital pulses over a selected period of time prior to said step of correlating.

4. The method of claim 1, further comprising:

providing a digital to analog converter for converting said plurality of digital pulses at said carrier frequency to an analog signal prior to said step of transmitting.

5. The method of claim 4, wherein said step of oversampling further comprises oversampling said received signal such that a sampling rate is used that is from five to fifty times said carrier signal.

6. The method of claim 1, wherein said first position is within a borehole through said earth formation.

7. The method of claim 6, further comprising transmitting said plurality of digital pulses from at least one dipole antenna within said borehole.

8. The method of claim 7, wherein said producing of said plurality of digital pulses at said carrier frequency is done entirely with digital components.

9. The method of claim 8, further comprising providing a plurality of dipole antennas within a downhole tool.

10. The method of claim 1, further comprising:

transmitting said plurality of digital pulses through a non-ferrous wellbore tubular.

11. A downhole system for detecting an interface in an earth formation, said downhole system being operable in a borehole within said earth formation, said downhole system comprising:

an all digital signal generator for producing a plurality of digital pulses at a carrier frequency;

at least one dipole antenna associated with said downhole system for transmitting a transmitted signal and receiving a received signal;

an analog to digital signal converter for sampling said received signal at a sampling rate more than five times said carrier frequency to produce a received digital signal;

and a correlator for comparing said plurality of digital pulses with respect to said received digital signal.

12. The downhole system of claim 11, further comprising a digital to analog converter for converting said plurality of digital pulses at said carrier frequency to an analog signal.

13. The downhole system of claim 11, further comprising:

a plurality of dipole antennas.

14. The downhole system of claim 11, wherein said analog to digital converter has a sampling speed of from five to fifty times said carrier frequency.

15. The downhole system of claim 11, wherein said carrier frequency is selectable and may be selected to be less than 1 MHz.

16. The downhole system of claim 11, wherein said carrier frequency is between 100 KHz and 1 MHz.

17. The downhole system of claim 11, further comprising:

a gate control for selecting a portion of said received signal related to a selected distance from said borehole.

18. The downhole system of claim 11, further comprising:

a digital accumulator operable for accumulating said plurality of digital pulses prior to said step of correlation.

19. A system for detecting an interface in a geological formation, comprising:

a transmitter operable for producing a plurality of digital pulses into said geological formation at a selectable carrier frequency from at least 500 KHz to 1 MHz;

a receiver for receiving a received signal comprised of reflections of said plurality of digital pulses from said geological formation;

an analog to digital converter for said receiver having a sampling speed at least five times faster than said carrier frequency to produce a digitized received signal; and a correlator for comparing at least a portion of said digitized received signal with said plurality of digital pulses.

20. The system of claim 19, wherein said system is operable for selectively transmitting at a frequency from 100 KHz to over 1 MHz.

21. The system of claim 19, further comprising a gate for selecting a time interval of said digitized received signal.

22. The system of claim 19, further comprising an accumulator for storing said digitized received signal for use by said correlator.

23. The system of claim 19, further comprising a digital to analog converter for said transmitter.

24. The system of claim 19, wherein said analog to digital converter has a sampling speed at least from five to fifty times said carrier frequency.

25. The system of claim 19, further comprising at least one dipole antenna.

26. The system of claim 19, further comprising a non-ferrous wellbore tubular through which said transmitter transmits said plurality of digital pulses.

27. The system of claim 19, further comprising one or more antennas positioned within a borehole.

28. The system of claim 19, wherein said transmitter is operable for producing said plurality of digital pulses at said carrier frequency entirely with digital components.

29. The system of claim 19, further comprising a digitally controllable filter for adjusting a frequency response of said received signal.

30. The system of claim 19, further comprising a wellbore tubular with an opening therein for receiving an antenna.

31. A downhole system for detecting an interface in a geological formation, said downhole system being operable in a borehole within said geological formation, said downhole system comprising:

an all digital signal generator for producing a plurality of digital pulses at a carrier frequency;

at least one dipole antenna associated with said downhole system for transmitting a transmitted signal and receiving a received signal;

an analog to digital signal converter for sampling said received signal at a sampling rate more than five times said carrier frequency to produce a received digital signal as well as to obtain proper range measurement accuracy and resolution for said interface;

and a pseudo-noise (PN) correlator for comparing said plurality of digital pulses with respect to said received digital signal.

32. A system for detecting an interface in a geological formation, comprising:

a transmitter operable for producing a plurality of digital pulses into said geological formation at a selectable carrier frequency from at least 500 KHz to 1 MHz;

a receiver for receiving a received signal comprised of reflections of said plurality of digital pulses from said geological formation;

an analog to digital converter for said receiver having a sampling speed at least five times faster than said carrier frequency to produce a digitized received signal and to obtain proper range measurement accuracy and range measurement resolution for said interface;

and a pseudo-noise (PN) correlator for comparing at least a portion of said digitized received signal with said plurality of digital pulses.

33. A downhole system for detecting a movable liquid body interface in a geological formation, said downhole system being operable in a borehole within said geological formation, said downhole system comprising:

an all digital signal generator for producing a plurality of digital pulses at a carrier frequency;

at least one dipole antenna associated with said downhole system for transmitting a transmitted signal and receiving a received signal;

a means for producing a received digital signal as well as increasing the accuracy and resolution of detecting said movable liquid body interface in said geological formation;

and a pseudo-noise (PN) correlator for comparing said plurality of digital pulses with respect to said received digital signal.

34. A system for detecting a movable body liquid interface in a geological formation, comprising:

a transmitter operable for producing a plurality of digital pulses into said geological formation at a selectable carrier frequency from at least 500 KHz to 1 MHz;

a receiver for receiving a received signal comprised of reflections of said plurality of digital pulses from said movable liquid body interface in said geological formation;

a means for producing a received digital signal as well as increasing the accuracy and resolution of detecting said movable liquid body interface in said geological formation;

and a pseudo-noise (PN) correlator for comparing at least a portion of said digitized received signal with said plurality of digital pulses.

* * * * *